United States Patent [19]
Yazawa et al.

[11] 4,431,272
[45] Feb. 14, 1984

[54] LIQUID CRYSTAL DISPLAY DEVICE

[75] Inventors: Satoru Yazawa; Shunji Banda; Kenichi Endo, all of Suwa, Japan

[73] Assignee: Kabushiki Kaisha Suwa Seikosha, Tokyo, Japan

[21] Appl. No.: 260,612

[22] Filed: May 5, 1981

[30] Foreign Application Priority Data

May 8, 1980 [JP] Japan .................................. 55-60951
Dec. 18, 1980 [JP] Japan ................................ 55-179521

[51] Int. Cl.³ .............................................. G02F 1/13
[52] U.S. Cl. ..................................... 350/336; 350/338
[58] Field of Search ............ 350/333, 336, 338, 339 D

[56] References Cited

U.S. PATENT DOCUMENTS

| | | | |
|---|---|---|---|
| 3,881,809 | 5/1975 | Fergason et al. | 350/338 |
| 4,106,859 | 8/1978 | Doriguzzi et al. | 350/338 |
| 4,126,383 | 11/1978 | Doriguzzi et al. | 350/338 |
| 4,217,035 | 8/1980 | Doriguzzi et al. | 350/338 |
| 4,298,249 | 11/1981 | Gloor et al. | 350/339 D X |

FOREIGN PATENT DOCUMENTS

| | | | |
|---|---|---|---|
| 2735564 | 4/1978 | Fed. Rep. of Germany | 350/336 |
| 2,744,034 | 3/1979 | Fed. Rep. of Germany | 350/338 |
| 1434906 | 5/1976 | United Kingdom | 350/338 |

*Primary Examiner*—John K. Corbin
*Assistant Examiner*—Richard F. Gallivan
*Attorney, Agent, or Firm*—Blum, Kaplan, Friedman, Silberman and Beran

[57] ABSTRACT

A liquid crystal display device including an opaque reflective electrode on the lower plate of the device is provided. The surface of the electrode is a rugged surface wherein the average angle of inclination of an inclined plane passing through the inclined regions of the rugged surface is 30 degrees or less with respect to a horizontal plane coinciding with the surface of the lower plate. The area where the angle of inclination of the rugged portions is greater than 40 degrees occupies 30% or less of the surface area of the electrode. The average pitch of the rugged regions of the electrode surface is greater than 3 μm and the depth of the rugged region is about 0.2 μm on the average, but less than 5 μm.

The opaque electrode is formed from a metal having a reflectance of 80% or more with respect to incident light entering from a direction substantially vertical to the lower plate. The electrode is preferably an aluminum electrode and the rugged surface is obtained by first depositing an insulating layer of SiO₂ by CVD and selectively etching the layer of SiO₂ at an angle of between 0 degrees and 30 degrees to form a rugged surface. Alternatively, the SiO₂ layer is treated by plasma spray and a resist is applied thereto. A widened viewing angle for a display utilizing a polarizer and a guest-host liquid crystal or a colored liquid crystal is obtained by utilizing the rugged electrode in accordance with the invention.

26 Claims, 30 Drawing Figures

FIG.1a
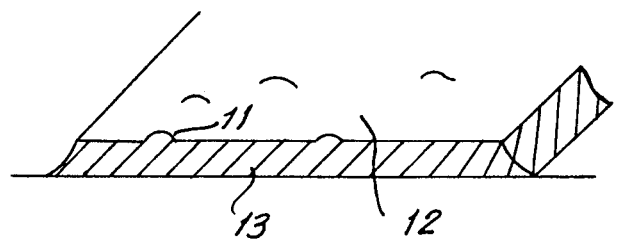
FIG.1b
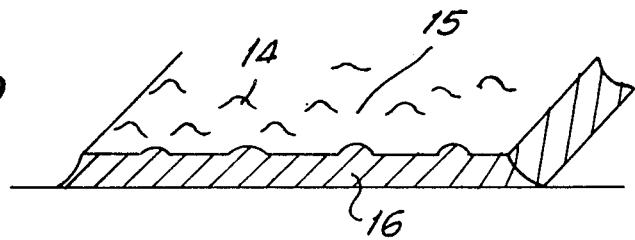
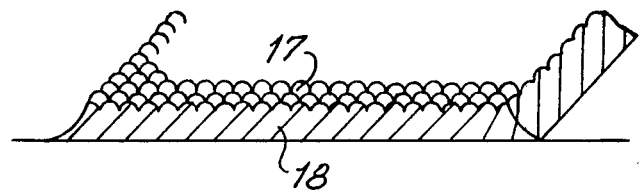
FIG.1c

FIG.6a
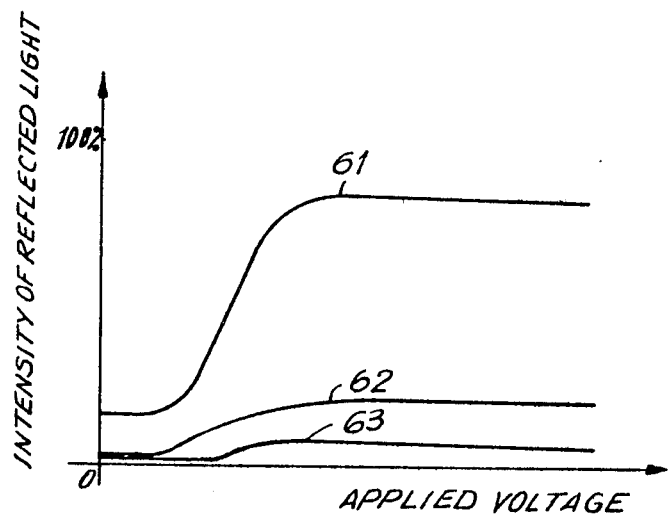
FIG.6b
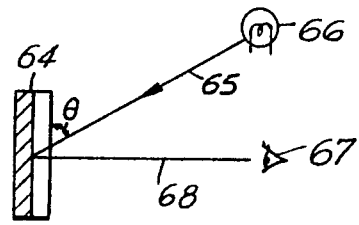
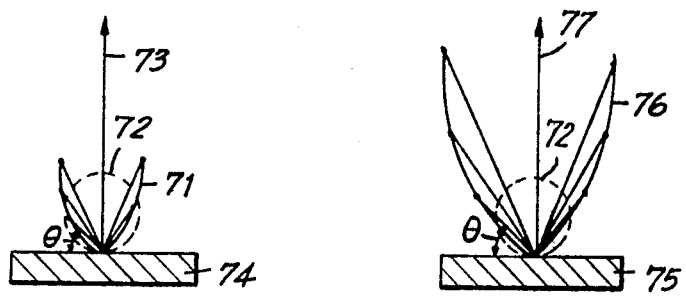
FIG.7a          FIG.7b

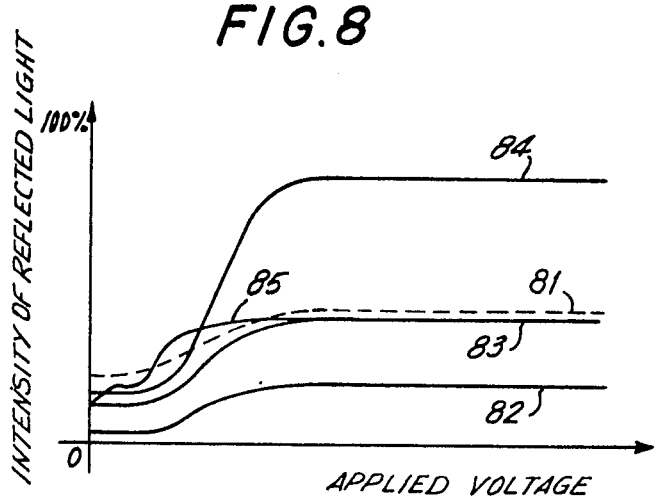
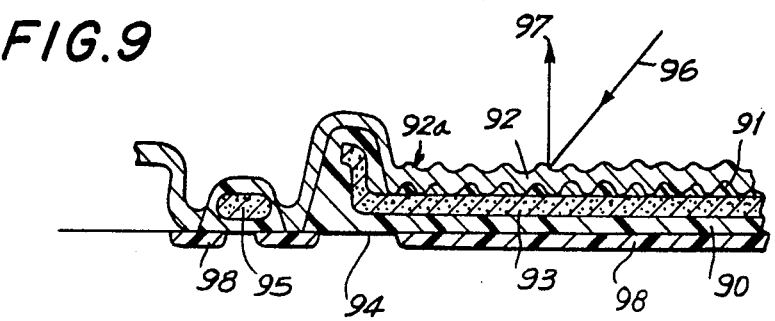
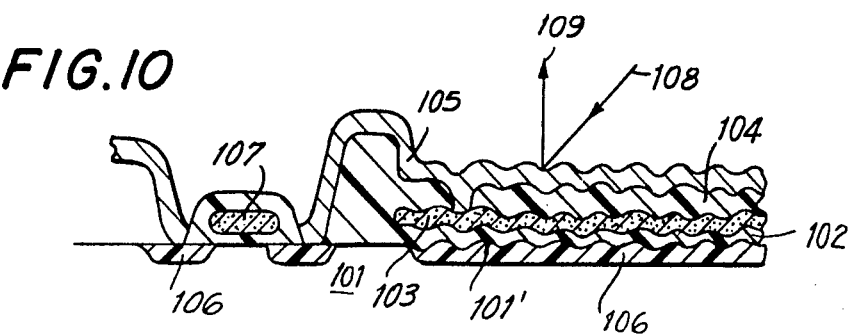

LIQUID CRYSTAL DISPLAY DEVICE

BACKGROUND OF THE INVENTION

This invention relates generally to a liquid crystal display device including an opaque substrate for a lower base plate, and in particular to the form of the surface of a metal electrode formed on the substrate.

Most conventional liquid crystal display devices utilizing an opaque metal electrode on the lower base plate of the device are the DSM (dynamic scattering mode) type. In most DSM type devices the metal electrode has a highly reflective or specular surface. On the other hand, in the case of the guest-host type display, the reflection characteristics of the metal electrode are the same as a standard white board. These conventional DSM type liquid crystal display devices suffer from the disadvantage that the viewing angle is relatively narrow. In the case of the conventional guest-host type liquid crystal display device, the display device utilizing a polarizer appears dark because the rugged electrode surface does not provide sufficient reflection.

Accordingly, it is desirable to provide an improved opaque metal electrode for a liquid crystal display device utilizing a polarizer in combination with a guest-host liquid crystal or a colored liquid crystal for providing a wider viewing angle.

SUMMARY OF THE INVENTION

Generally speaking, in accordance with the invention, an improved opaque metal electrode on a lower plate of a liquid crystal display cell, an improved liquid crystal display cell including the opaque electrode and a method of preparing the opaque electrode are provided. The surface of the electrode is rugged with the average angle of inclination of an inclined plane through the rugged surface regions being 30 degrees or less with respect to a horizontal plane through the lower base plate of the display panel and preferably between 10 degrees and 15 degrees when the refractive index of the liquid crystal material is 1.5. The distribution dispersion of the surface area corresponding to each angle between 5 degrees and 25 degrees must be greater than 2%. The pitch of the rugged surface regions of the metal electrodes is greater than 1 μm on the average and the surface area having a pitch less than 0.7 μm is 30% of the area of the electrode. The metal utilized as the electrode has a reflectance greater than 80% with respect to incident light entering from a direction substantially vertical to the electrode surface.

A liquid crystal display device including the opaque electrode in accordance with the invention generally utilizes a silicon substrate with transistors for controlling the signal applied to the picture elements. An insulating layer such as $SiO_2$ is disposed thereon by chemical vapor deposition. The insulating layer is etched by paper-etching and aluminum as the electrode may be evaporated thereon. Alternatively, the $SiO_2$ layer may be treated by plasma spray and the surface etched at an angle between 0 degrees and 30 degrees in order to provide a surface in accordance with the invention.

A liquid crystal display device including an opaque metal electrode on the lower base plate in accordance with the invention when operated in the DSM mode has an enlarged viewing angle. Additionally, when the electrode is included in a display device including a polarizer in combination with a guest-host liquid crystal or a colored liquid crystal material, improved brightness is obtained.

Accordingly, it is an object of the invention to provide an improved opaque metal electrode for the lower base plate of a liquid crystal display device.

It is another object of the invention to provide improved liquid crystal display device including an opaque metal electrode on the lower base plate.

It is a further object of the invention to provide an opaque metal electrode for the lower base plate of a liquid crystal display device for increasing the viewing angle of a DSM type liquid crystal display device.

Still another object of the invention is to provide an improved opaque metal electrode for the lower base plate of a liquid crystal display device including a polarizer and a guest-host liquid crystal material.

Still a further object of the invention is to provide an improved opaque metal electrode for the lower base plate of a liquid crystal display device including a polarizer and a colored liquid crystal material.

Yet another object of the invention is to provide an improved liquid crystal display device.

Yet a further object of the invention is to provide a liquid crystal display device having a wide field of view.

Still a further object of the invention is to provide a method for forming an improved opaque metal electrode for the lower base plate of the device.

Another object of the invention is to provide an improved opaque metal electrode having a rugged surface wherein the average angle of inclination is less than 30 degrees.

Still other objects and advantages of the invention will in part be obvious and will in part be apparent from the specification.

The invention accordingly comprises the several steps and the relation to one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 1(a), (b) and (c) show the surface form of opaque electrodes which are utilized in liquid crystal display panels;

FIG. 6(a) graphically illustrates the voltage-reflected light intensity characteristic of display panels including different base plates;

FIG. 6(b) illustrates the method utilized for measuring the results illustrated in FIG. 6(a);

FIGS. 7(a) and (b) illustrate the reflection characteristic of the base plates of 1(c) and the base plate in accordance with the invention, respectively;

FIG. 8 graphically illustrates the voltage-reflected light intensity characteristic of an aluminum electrode plate having the reflection characteristics as illustrated in FIG. 7(a);

FIG. 9 is a cross-sectional illustration of the base plate of a liquid crystal display device constructed and arranged in accordance with an embodiment of the invention;

FIG. 10 is a cross-sectional view illustrating the construction of the base plate of a liquid crystal display device in accordance with the embodiment of the invention;

DESCRIPTION OF THE PREFERRED EMBODIMENTS

Figure 2A:
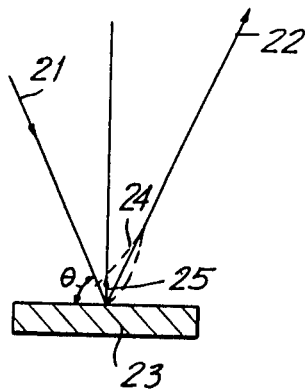
FIGS. 2(a), (b) and (c) illustrate the intensity distribution of reflected light on the electrod surfaces shown in FIGS. 1(a), (b) and (c), respectively.

FIGS. 1(a), (b) and (c) illustrate an aluminum electrode, 13, 16 and 18, respectively for use on the lower panel of a liquid crystal display device including an opaque semiconductor substrate. Each electrode 13, 16 and 18 includes a particularly characteristic surface 12, 15 or 17, respectively. In FIG. 1(a) surface 12 is slightly rugged and includes convex portions 11 obtained by recrystalizing aluminum electrode 13 following heat treatment. Surface 12 is slightly rugged, but almost substantially specular or reflective. Electrode 16 in FIG. 1(b) has surface 15 being flat for about 80% or more of the surface area and includes rugged regions 14. Rugged regions 14 are formed by depositing a $SiO_2$ layer by CVD on heated aluminum and then coating the surface with aluminum. Electrode 18 in FIG. 1(c) is finely rugged with rugged regions 17 covering the entire surface 17. Rugged region 17 are formed by etching after heat treating aluminum electrode 18. In each case the angle of inclination of the rugged regions and the average depth and pitch are not controlled. Aluminum or aluminum alloy having a large reflectance is used for electrodes 13, 16 and 18.

In order to form surface 12 as shown in FIG. 1(a) aluminum electrode 13 is heated to a temperature in the range of between about 300° C. and 450° C. In order to obtain surface 15 as illustrated in FIG. 1(b) a layer of $SiO_2$ having a thickness of about 0.3 to 1.0 μm is deposited on surface 12 by CVD and then an additional aluminum layer is coated thereon. The highly rugged surface 17 as illustrated in FIG. 1(c) is obtained by heating an aluminum alloy containing about 2% silicon to between about 400° C. and 450° C. and then etching the upper region thereof.

When a liquid crystal display panel utilizes an opaque and electrically conductive material as an electrode, the electrode itself must serve as a reflector. Accordingly, it has been found that the surface form of the electrode exerts a significant influence upon the quality of the display. FIGS. 2(a) (b) and (c) show the reflection characteristics of electrode surfaces 12, 15 and 17 as shown in FIGS. 1(a), (b) and (c), respectively.

As shown in FIG. 2(a), when a ray of incident light 21 strikes a substantially reflective base plate 23 at an angle $\theta = 25$, the light intensity distribution of reflected light is shown by a dash line 24. A ray of reflected light 22 reflected in the same angle, shown for $\theta = 65°$, as incident light 21 is of high intensity with the intensity of reflected light in other directions being extremely small compared with the direction of specular light ray 22. When a user views a liquid crystal display panel including base plate 23 from the precise direction of specular reflection 22 of illuminating light 21, it appears bright. This is due to the high light intensity of reflected light in this direction, but the display properties of the device are not fully satisfactory as the brightness of the display rapidly decreases if the user views the panel in any direction other than the direction of specular reflection.

When a user views a liquid crystal display panel in a direction other than that of the reflected angle of the illuminating rays, it appears dark because the light intensity of a reflected light ray 25 substantially perpendicular to base plate 23 is very low. As the liquid crystal display panel is a reflective-type display device, if the reflection characteristic of the reflector of the panel is poor, sufficient contrast cannot be obtained for suitable viewing. Accordingly, when the electrode on the lower plate of the display panel serves as a reflector, it is necessary to make the electrode surface in a precise manner so that the light intensity of the reflected light in the viewing directions is high. Generally, the user views a liquid crystal display panel from a direction substantially perpendicular to the panel. In this case, the intensity of light entering from an angle about 45 degrees or more with respect to the horizontal is high so that the display panel appears bright. In this case, a viewer actually views the display panel corresponding to the ray of reflected light 25 in the normal direction.

Figure 2B:
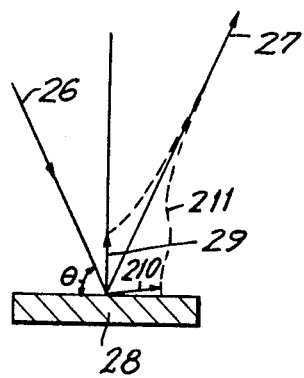

FIG. 2(b) illustrates the reflection characteristics of a display panel base plate having surface 15 as illustrated in FIG. 1(b). A $SiO_2$ layer is formed on surface 12 of FIG. 1(a) by CVD in order to make rugged regions 14 of surface 15 larger. An aluminum electrode is then formed thereon.

Referring again to FIG. 2(b), the intensity of reflected components 27 at an angle of specular reflection are higher than the reflection components in other directions shown by a curve 211 due to the fact that the reflective areas of surface 15 make up a significant portion of the surface area. Since it is difficult to control the inclination angle of a rugged surface, a light ray 210 reflected in a direction substantially parallel to the display panel may be greater than the intensity of a light ray 29 reflected in the direction normal to base plate 28. Thus, it cannot be said that light is reflected in the viewing direction with good efficiency. In other words, as noted above, it must be recognized that a viewer generally views the display panel in a direction substantially normal thereto.

Figure 2C:
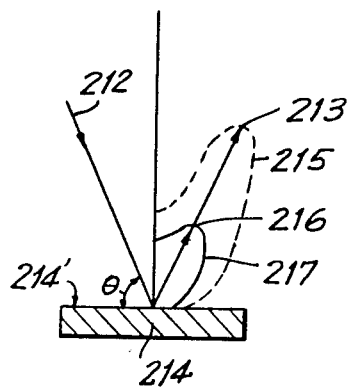

FIG. 2(c) illustrates the reflection characteristics by a curve 215 on a finely rugged surface 214' of an aluminum electrode 214 which is formed by heating an aluminum-silicon alloy at a temperature of 400° C. to 450° C. and then etching the upper portion thereon. The average pitch, or distance between the peak of rugged regions, is about 1 μm and the average depth of the rugged regions is between 0.3 μm and 0.5 μm. For such a rugged metal surface as surface 214', the entire luminous flux decreases because the light is reflected several times and a display panel including same appears grayish.

In cases where the depth of the rugged regions of an aluminum electrode is equal to the pitch, the surface appears dull when a liquid crystal material has a refractive index of about 1.5 is used. On a rugged metal surface wherein the pitch is substantially the same as the wavelength of the light, the reflected light is scattered and the polarization characteristics are not maintained, particularly when the light is reflected several times. Additionally, the reflection characteristics of the surface varies when the electrode is utilized in a liquid crystal display device with a liquid crystal material adjacent to the surface due to the changes in response along the pitch and depth of the rugged surface.

In a liquid crystal display device using a guest-host liquid crystal material wherein the base plate is used for a bright portion and the dye absorbs light for the dark portion, one cannot obtain a satisfactory display. The luminous flux of reflected light is reduced compared to operation in the dynamic scattering mode. For electrode 214 of FIG. 2(c), when the pitch is about 0.5 μm and the average depth is about 0.4 μm, a reflection curve 217 is obtained and the base plate appears dark. Thus, the appearance is dependent upon the inclination angle of the inclined plane of the rugged surface.

Figure 3A:
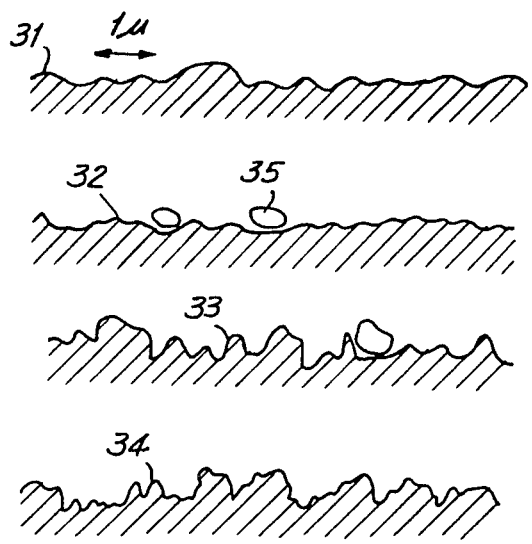
FIG. 3(a) is a cross-section of typical rugged surface.

FIG. 3(a) illustrates four typical rugged surfaces, 31, 32, 33 and 34. Each surface is obtained by heating and etching an aluminum-silicon alloy under varying conditions. In each case, the rugged surfaces are different in size and form. Electrode surface 31 may be characterized as being "gently rugged", whereas electrode surface 32 is also gently rugged, but the pitch of rugged surface 32 is smaller than that of surface 31. Electrode surface 33 may be characterized as "highly rugged" with the pitch alsmot equal to that of surface 31. Electrode surface 34 is also highly rugged, but having a pitch which is very small.

Figure 3B:
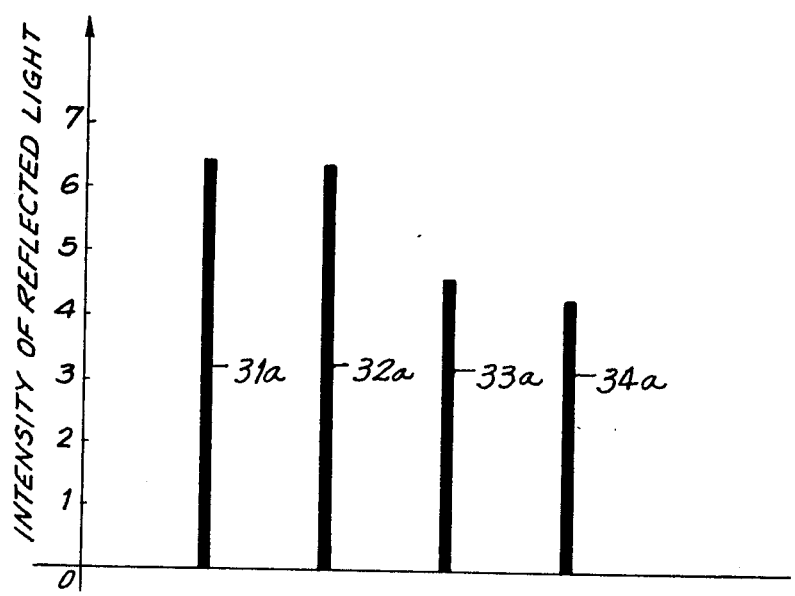
FIG. 3(b) graphically illustrates reflected light intensity on the rugged surfaces shown in FIG. 3(a)

FIG. 3(b) graphically illustrates the intensity of reflected light for each electrode base plate illustrate in FIG. 3(a). For each electrode surface, the intensity of light reflected in a direction normal to the base plate indicated by bars 31a, 32a, 33a and 34a, respectively, is measured when incident light enters at an angle of 60 degrees thereto. The greater the intensity of the reflected light, the more bright and clear a display panel appears. For the electrode surfaces of FIG. 3, brightness decreases in the order of 31, 32, 33 and 34. Thus, it has been found that a gently rugged surface having a large pitch such as surface 31 is desirable.

Figure 3C:
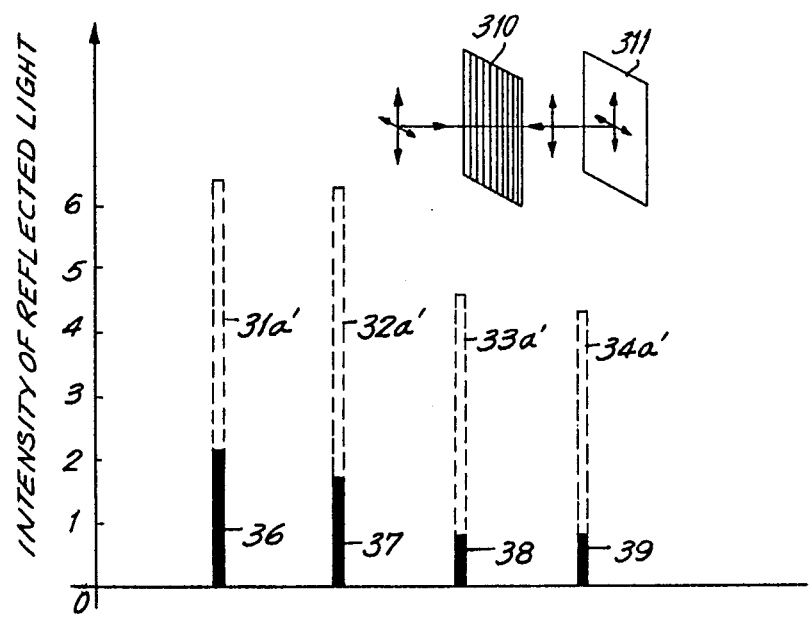
FIG. 3(c) graphically illustrates the reflected light intensity on the base plates of FIG. 3(a) when a polarizer is disposed over the base plate.

FIG. 3(c) illustrates the intensity of reflected light on the electrode base plates of FIG. 3(a) measured when a polarizer 310 is disposed over a base plate 311 having surfaces 31, 32, 33 and 34 disposed thereon. The intensity of reflected light in a direction normal to base plate 311 was measured with a polarizer disposed over each of surfaces 31, 32, 33 and 34 as shown by solid bars 36, 37, 38 and 39, respectively. The broken-line bars 31a', 32a', 33a' and 34a' each represent the intensity of reflected light in the absence of polarizer 310 as illustrated in FIG. 3(b). This demonstrates that the intensity of the reflected light remains greater for the surfaces which are more gently rugged and have a larger pitch.

Figure 3D:
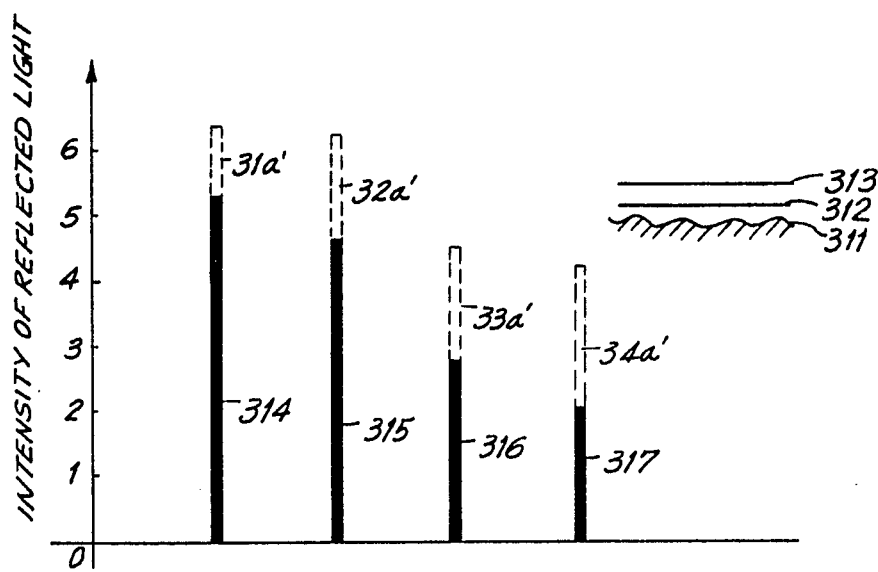
FIG. 3(d) graphically illustrates the reflected light intensity when a liquid crystal material without dyes is disposed between the base plates of FIG. 3(a) and an upper glass plate.

FIG. 3(d) illustrates the intensity of reflected light in the normal direction measured when electrode surfaces 31, 32, 33 and 34 are provided on the lower base plate of a liquid crystal display cell with a liquid crystal material (without containing dyes) 312 is included in the cell between a base plate 311 and an upper glass plate 313. Solid bars 314, 315, 316 and 317 illustrate the intensity of the reflected light when liquid crystal 312 is utilized in conjunction with base plates, 31, 32, 33 and 34, respectively, of FIG. 3(a). This also illustrates that the intensity of reflected light remains higher when the surface is rugged more gently and the pitch is greater for a surface of the type illustrated as 31 in FIG. 3(a). Such a surface can offer a bright liquid crystal display.

The conditions which a base plate surface must possess in order to provide a bright display in a liquid crystal display panel are as follows. It is desirable that the average angle of inclination of the rugged surface is not steep. For example, the average angle should be about 30 degrees or less. The pitch of the rugged surface may be large compared to the wavelength of light, namely about 1 μm or more, on the average. If the angle of inclination is large, the display panel may appear dark because the light is reflected several times. On the other hand, if the pitch is as small as the wavelength of light and the inclination of the rugged surface is steep, a display panel including a polarizer also appears dark because the polarization characteristic of the light is lost. A rugged surface for an opaque base plate electrode constructed and arranged in accordance with the invention eliminates these disadvantages. The surfaces in accordance with the invention aim at improving a display effect of a display device including an opaque base plate, such as a semiconductor substrate wherein reflection from the surface of the substrate is used for the bright portions of the display.

The term "display effect" used above is the ratio of the absolute value of the intensity of reflected light when the liquid crystal display panel is lit and when the display panel is not lit. Specifically, a superior display effect occurs when the ratio of the intensity of reflected light (when lit: not lit) is high and the absolute value of the intensity of reflected light on the white (bright) portion is high. The rugged surfaces and display panels in accordance with the invention will now be described in detail.

Figure 4A:
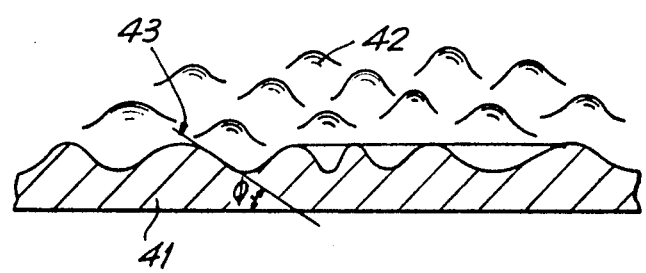
FIGS. 4(a), (b) and (c) are sectional views illustrating the surfaces of aluminum electrodes prepared in accordance with the invention.

FIG. 4(a) is a typical sectional view illustrating an aluminum electrode 41 having a surface 42 in accordance with the invention. The average angle of inclination of the inclined plane along surface 42 having a section similar to a sine wave is between about 5 degrees and 30 degrees with respect to a plane through the base of electrode 41. Light incident to electrode 41 is rarely reflected repeatedly and thereby provides excellent reflection characteristics. The pitch of surface 42 is denoted by $P_1$, $P_2$ and $P_3$ and is not uniform. The nonuniform pitch prevents reflected rays of light from each inclined plane 43 from being interferred by light reflected from adjacent inclined plane and appearing colored.

Figure 4B:
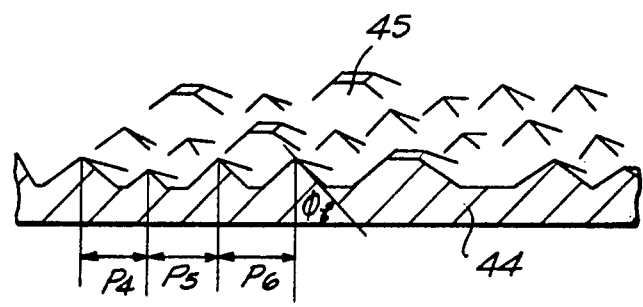

Referring now to FIG. 4(b) a typical sectional view of an aluminum electrode 44 having a surface 45 wherein the sectional form is similar to a triangle is shown. The pitch, or distance between adjacent peaks in surface 45 denoted by $P_4$, $P_5$ and $P_6$ which are also not uniform.

Figure 4C:
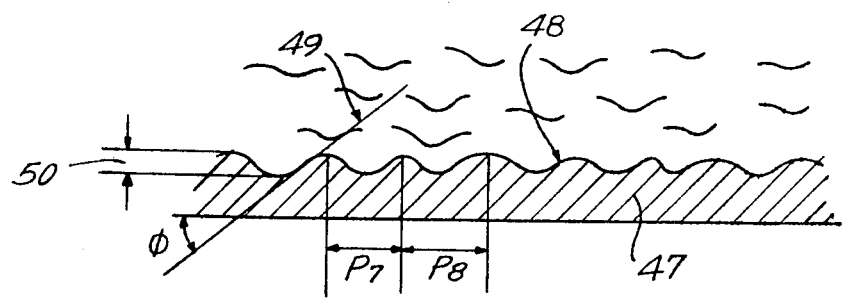

FIG. 4(c) is another typical sectional view of an aluminum electrode 47 having a surface 48 in accordance with the invention. The angle of inclination $\phi$ of inclined plane 49 through the rugged surface is between 5 degrees and 30 degrees on the average as in the case of FIG. 4(a). Pitch $P_7$ and $P_8$ are large compared with the wave length of light so as not to destroy the polarization characteristic of the light striking surface 48. When the depth 50 of a rugged surface is large, it is difficult to treat the surface in order to orient the liquid crystal molecules in the display device. Thus, when the orientation of the liquid crystal molecules is not stable a decrease in contrast results. Accordingly, the depth 50 of rugged surface 49 is generally set about 0.2 $\mu$m on the average with a maximum depth of 5 $\mu$m or less.

On the other hand, if depth 50 is too shallow, the base plate will show highly reflective characteristics and reduce the quality of the display. A base plate constructed in accordance with the invention differs from the base plates prepared from etched aluminum-silicon alloys in external appearance. The base plate prepared in accordance with the invention may be described as a model having reflective inclined planes arranged in different directions. Such a base plate is defined by geometrical optics and provides a metallic sheen in external appearance.

Figure 5A:
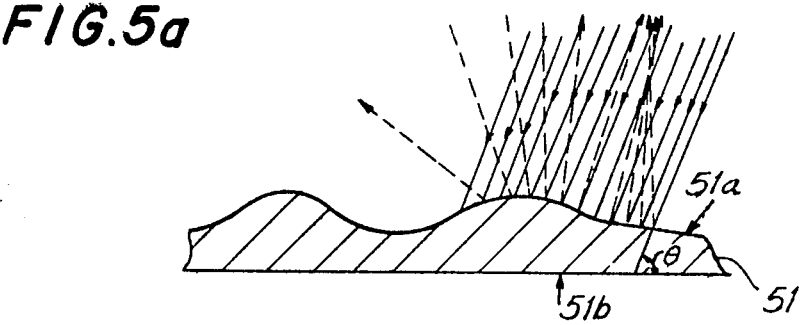
FIG. 5(a) illustrates how rays of incident light are reflected from the surface of the aluminum electrode of FIG. 4(c)

FIG. 5(a) illustrates how rays of incident light 52 are reflected from an aluminum electrode 51 having a structure as illustrated in FIG. 4(c). Rays of incident light 52 enter at an angle $\theta$ of about 70 degrees with respect to a horizontal plane 51b at the base of aluminum electrode 51. The ratio of reflected light to incident light is not very hgh, but the intensity of light reflected in the direction 53 normal to base plate 51b is relatively high. Such a base plate as illustrated in FIG. 5(a) provides a good quality display.

Figure 5B:
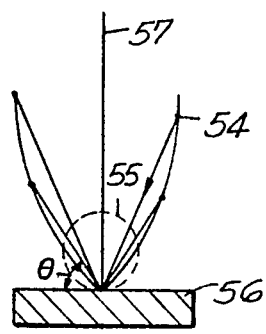
FIG. 5(b) illustrates the reflection characteristics of the surface of the aluminum electrode of FIG. 4(c)

FIG. 5(b) illustrates the reflection characteristics on surface 48 of aluminum electrode 47 having a structure as shown in FIG. 4(c) and shows from which direction incident light is reflected in a direction 57 normal to base plate 56. The intensity of reflected light is greater than the intensity of light reflected from a standard white board. Accordingly, favorable brightness is obtained in a liquid crystal display panel including electrode 51 in the direction a user usually views the display. When the display device utilizes a polarizer in combination with a guest-host liquid crystal, the display effect relies heavily on the reflection characteristic of the electrode plate.

Referring now to FIG. 6(a), a graph illustrating the voltage-intensity of reflected light characteristics of display panels including different base plates measured by a method illustrated in FIG. 6(b) is shown. A ray of incident light 65 from an illuminant 66 is reflected from a lower base plate 64 of the panel and the intensity of the light is converted into a voltage by a photo-multiplier 67. In this device, 100% of the intensity of reflected light is defined as a value obtained by measuring the intensity of reflected light from a standard white board when angle $\theta$ is set at 65 degrees. The voltage intensity of reflected light characteristic curves 62 and 63 are obtained when using a base plate of the type illustrated in FIG. 1(a) and (c), respectively. Characteristic curve 61 is obtained when utilizing a base plate constructed and arranged in accordance with the invention.

As can be seen from FIG. 6(a), liquid crystal display panels including a base plate of the type illustrated in FIG. 4 in accordance with the invention exhibit superior reflection characteristics. Curve 62 illustrates the voltage-intensity of reflected light characteristics for a liquid crystal panel including an aluminum alloy electrode base plate having a rugged surface formed by etching after heat treatment at 400° C. to 500° C. Curve 63 is the characteristic curve of a liquid crystal display device panel including an aluminum electrode base plate with a substantially specular surface formed by heat treatment of 300° C. to 450° C. as illustrated in FIG. 1(a). When a base plate 75 prepared in accordance with the invention is utilized, curve 61 shows that the maximum intensity of reflected light in a lit condition is about 80% of that obtained for a standard white reflector.

FIG. 7 illustrates how rays of incident light entering from directions inclined at an angle $\theta$ with respect to the horizontal plane of the panel are reflected in a normal direction. The intensity of reflected light denoted by arrow 73 in FIG. 7(a) or by arrow 77 in FIG. 7(b) in a direction normal to the plane of base plates 74 and 75 correspond to the brightness of the display panel reaching the user. Curve 71 illustrates the intensity of incident light to be reflected in the direction 73 normal to base plate 74. Curve 72 is the intensity of incident light to be reflected in the direction normal to base plate 74 for a standard white board. Base plate 74 is an aluminum electrode base plate wherein the rugged surface is formed by etching after carrying out a heat treatment between 400° C. and 450° C. A typical cross-section is shown in FIG. 1(c).

In FIG. 7(b) curve 76 represents the intensity of incident light to be reflected in the normal direction 77 with respect to base plate 75. Base plate 75 is an aluminum electrode prepared in accordance with the invention.

Voltage-intensity of reflected light characteristics curve 62 of FIG. 6(a) was obtained by measuring the intensity of reflected light as follows. The reflection characteristic of a display panel including aluminum electrode plate 74 in FIG. 7(a) was measured. The intensity of reflected light was also measured for a display panel including a standard white board. When a reflective aluminum electrode of the type illustrated in FIG. 1(a) was used, the voltage-intensity of reflected light characteristics curve 63 was obtained. In each case, the voltage-intensity of reflected light characteristics of the liquid crystal display panels were measured by the method of FIG. 6(b) wherein angle $\theta$ equals 65 degrees.

As can be seen from FIG. 6(a) the ratio of the intensity of reflected light in a lit condition $R_{ON}$ to that of a non-lit condition $R_{OFF}$ is almost the same in each display panel when there is no reflection on the surface of the panel. Of course, a liquid crystal display panel including a base plate in accordance with the invention has a greater absolute value of the intensity of the reflected light and can provide a brighter display than when using panels of the type illustrated in FIG. 1. When the absolute value of the intensity of reflected light is small as illustrated by curves 62 and 63, there is little difference between the intensity of reflected light of a lit portion and that of a non-lit portion in the display panel. This causes an indistinguishable display of low contrast. As mentioned above, when a liquid crystal display panel includes a opaque base plate prepared in accordance with the invention, the reflection characteristics of the aluminum electrode on the base plate closely correspond with the display effect for the display panel.

Referring specifically to FIG. 8, the voltage-reflected light intensity characteristics for an aluminum electrode plate having the reflection characteristics illustrated in FIG. 7(a) are shown. Curve 82 illustrates the voltage-reflected light intensity characteristic where a polarizer is disposed on the surface of the display panel. Curve 81 illustrates the characteristic when a polarizer is not used. Curve 83 illustrates the characteristics when a polarizer is not used, but the so-called White Taylor type guest-host liquid crystal material wherein a cholesteric liquid crystal material serves as the host material is used. The voltage-reflected light intensity characteristic wherein the base plate is prepared in accordance with the invention and a polarizer is provided on the surface of the display panel is illustrated by curve 84. The display panel including the guest-host material without a polarizer of curve 83 exhibits a hysteresis effect recorded as curve 85.

According to the results recorded in FIG. 8, if a polarizer is not included in the display panel, the panel provides a bright display, but the ratio of the intensity of reflected light in a lit condition to that in a non-lit condition is low. This results in a display quality which is inferior. On the other hand, if a polarizer is utilized, the contrast is superior, but the panel is not bright enough. When a White Taylor type guest-host liquid crystal material is used a ratio of the intensity of reflected light of the lit to the non-lit condition of about 3 is obtained, even without a polarizer. However, the panel is not bright if the base plate of the type illustrated in FIG. 7(a) is utilized.

A display panel including a White-Taylor guest-host liquid crystal material exhibits superior display characteristics compared to a display panel including a polarizer and the same base plate with another guest-host liquid crystal material. This is because a display panel with a polarizer including a guest-host liquid crystal material exhibits a lower absolute value of intensity of reflective light, although it exhibits a larger ratio of reflected light intensity between the lit and non-lit condition of between about 7 and 10. This indicates that the brightness of the base plate has a large influence upon the display quality. Additionally, the ratio of reflected light intensity is improved somewhat by increasing the concentration of the guest. Thus, a White-Taylor type guest-host liquid crystal may show an improved display effect if the concentration of the guest is increased and a base plate having the reflection characteristics in accordance with the invention is used. However, since the White-Taylor type liquid crystal material provides the hysteresis exhibited as illustrated by curve 85, the response speed is low in the grayscale display. Thus, it is more difficult to use this type of liquid crystal material.

Referring specifically to FIG. 9, an embodiment of the invention wherein an aluminum electrode 92 having a surface 92a in accordance with the invention in a liquid crystal display device is shown. In this display device, a silicon substrate 94 is formed with transistors for controlling the signal applied to each picture element of the display device and is used as an opaque base plate. The transistor with the picture element illustrated includes a diffused region 98 and a gate portion 95. In order to obtain aluminum electrode 92 having surface 92a which is shaped as a triangle or sine curve in section, one of the following procedures is followed. A first $SiO_2$ layer 90 is disposed on silicon substrate 94 and a polysilicon layer 93 is selectively disposed in the region for forming the picture elements. A $SiO_2$ insulating layer 91 is disposed on polysilicon layer 93 by the CVD method and is treated by taper-etching for forming a triangular sectional shape and then aluminum for electrode 92 is evaporated thereon. By manipulating insulating layer 91 near the surface in this manner, it is possible to form a triangle-shape surface without exerting any influence upon the transistor forming processes or other techniques needed for completing the display. Similarly, when it is desired to obtain electrode 92 with a rugged surface 92a with a section having the shape of a sine wave, insulating layer 91 may be treated by plasma spray prior to applying a resist. Generally, this adversely effects adherence between the resist and insulating layer 91. Accordingly, the surface of insulating layer 91 is etched at an angle between about 0° to 30° because the etching speed in a horizontal direction is higher than that in the vertical direction. When $SiO_2$, $SiO_2$ having phophorous doped therein, or $SiO_2$ layers heated at different conditions are etched, the surface having an angle of inclination between about 0° and 30° may be obtained. In the case of taper-etching, surface 92a having a gentle angle of inclination of from 5° to 30° with a pitch less than about 0.5 μm and a depth less than the pitch may be readily obtained. This provides excellent results in a liquid crystal display device utilizing this surface as the opaque base plate.

Referring now to FIG. 10, an aluminum electrode plate having a surface with a structure in accordance with the invention is shown. In the liquid crystal display device shown, the signal to be applied to each picture element is controlled by transistors formed in an opaque semiconductor substrate. Specifically, a base plate 101 is partially oxidized by LOCOS process and the oxide layer thus formed is removed by etching to form a rugged region 101' of base plate 101. A layer of $SiO_2$ 102 is applied to rugged surface 101' and a polysilicon layer 103 is disposed thereon. A further $SiO_2$ insulating layer 104 is disposed on polysilicon layer 103 and an aluminum electrode 105 is deposited thereon. The various film may be deposited by CVD. The transistors for controlling signals applied to each picture element of the of FIG. 10 include diffused regions 106 and a gate oxide film 107. Incident light is indicated by an arrow 108 and light reflected in a direction normal to base plate 101 is shown by an arrow 109.

The rugged surface regions of an aluminum electrode 105 provide good reflection characteristics so that a bright display panel is provided. A liquid crystal display panel including a base plate of the type illustrated in FIG. 10 can also be utilized in a portable television receiver. This type of panel is particularly useful because the incident polarized light is not disordered by the opaque base plate and the ratio of the reflected light in the normal direction 109 to the incident light 108 entering at an angle θ of more than 45 degrees with the horizontal is large. A detailed explaination with respect to the relationship between the reflection characteristics and the form of the rugged surface of aluminum electrodes 105 will be set forth.

Figure 11A:
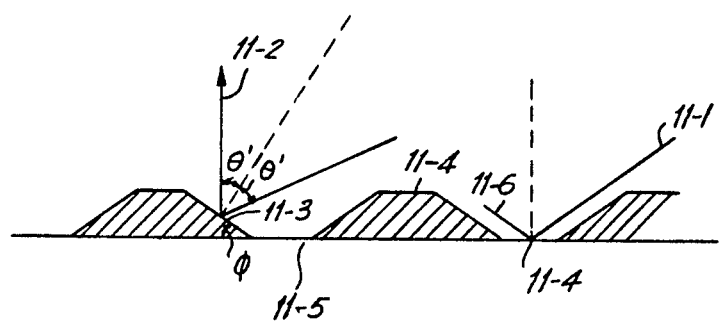
FIGS. 11(a) and (b) are sectional views of typical rugged electrode surfaces in accordance with the invention.
Figure 11B:
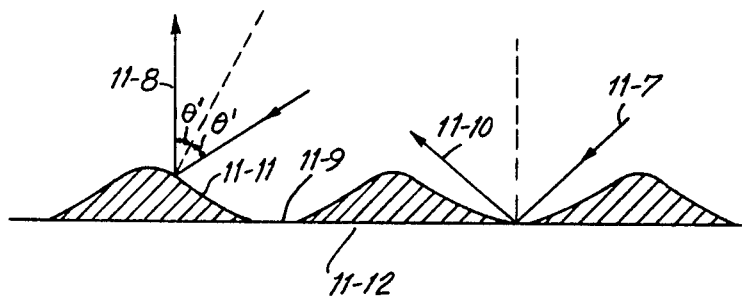

FIGS. 11(a) and (b) are typical sectional views illustrating rugged surfaces of aluminum electrodes compared in accordance with the invention. FIG. 11(a) is an example of an electrode surface wherein a portion of the cross-section of the surface includes straight line regions on a base plate 11-5. In FIG. 11(b) the cross-section of the electrode surface approaches that of a sine wave on a base plate 11-12.

Referring specifically to FIG. 11(a) the electrode surface including sections of an inclined plane provides a cross-section of almost straight lines. For a surface having this type of configuration, a ray of incident light 11-1 is reflected from an inclined plane region 11-3 or a horizontal plane region 11-4. When incident light 11-1 is reflected at horizontal plane 11-4, it is reflected as specularly reflected light 11-6 reflected. Incident light 11-1 is reflected from inclined plane region 11-3 in a direction 11-2 normal to base plate 11-5. Both reflected light 11-2 and 11-6 are high in intensity as the light reflected in other directions is substantially of lower intensity compared thereto. It has been found that the angle of inclination $\phi$ of the rugged surface required to provide good reflection characteristics for a liquid crystal display panel is between about 10 degrees and 15 degrees with respect to a horizontal plane through the base plate.

In FIG. 11(b) a similar result is obtained wherein the cross-section of the electrode surface represents a sine wave. In this figure most of a ray of incident light 11-7 is reflected in a direction 11-8 normal to base plate 11-12 and in the direction of specular reflection 11-10 in the regions of horizontal plane 11-9. The intensity of reflected light from base plate 11-12 in normal direction 11-8 and specular direction 11-10 is even greater than for the electrode surface of the type illustrated in FIG. 11(a) wherein light is reflected at somewhat varying angles.

Figure 12A:
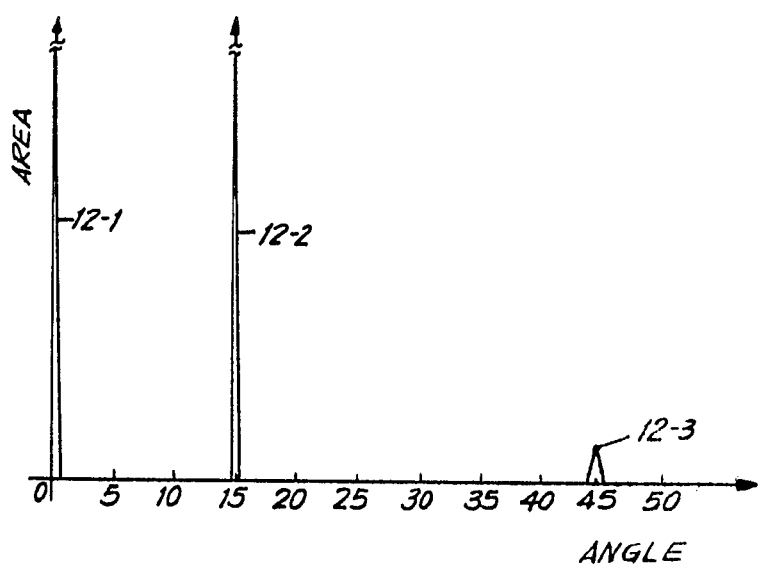
FIGS. 12(a) and (b) graphically illustrate the distribution of inclination angle of the rugged surfaces of the base plates illustrated in FIGS. 7(a) and (b), respectively.

FIGS. 12(a) and (b) illustrate the distribution of the angle of inclination of the rugged regions for the electrode surfaces illustrated at FIGS. 11(a) and (b), respectively. The abscissa in each graph represents the angle $\phi$ formed by a plane through the inclined region of the electrode surface and a horizontal plane. The ordinate represent the extent or area of the whole electrode surface occupied by inclined planes having an angle $\phi$.

Figure 12B:
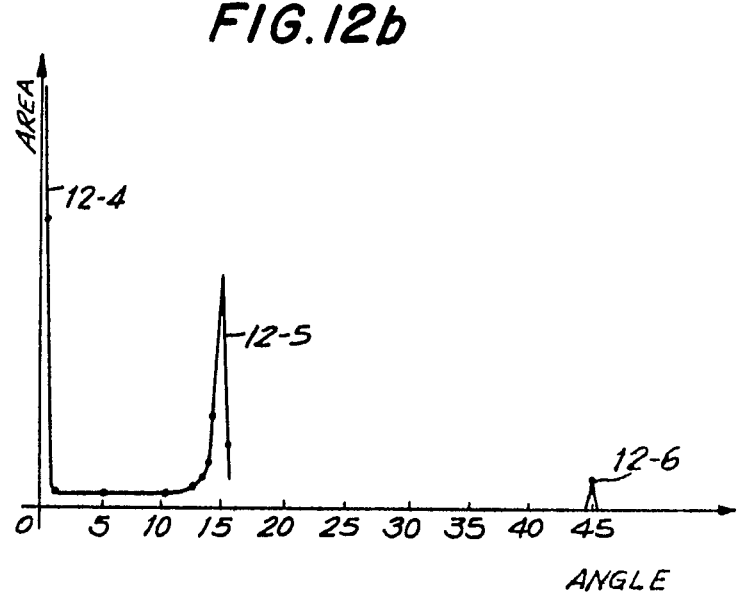

In FIG. 12(a) when $\phi=15$ degrees, most of the area of the electrode surface is occupied by the inclined planes having an inclination angle of 0° or 15° as shown by peaks 12-1 and 12-2, respectively. A minor region of the surface area is occupied by inclined planes having an angle of about 45° formed by the etching process during formation of the semiconductor substrate. In FIG. 12(b) most of the surface area of the electrode is occupied by inclined planes having an angle of inclination of 0°, 15° or 45° as illustrated by peaks 12-4, 12-5 or 12-6, respectively. A significant portion of the surface area occupied by inclined plane having an angle between 0° and 15° as illustrated by curve 12-7.

Figure 13A:
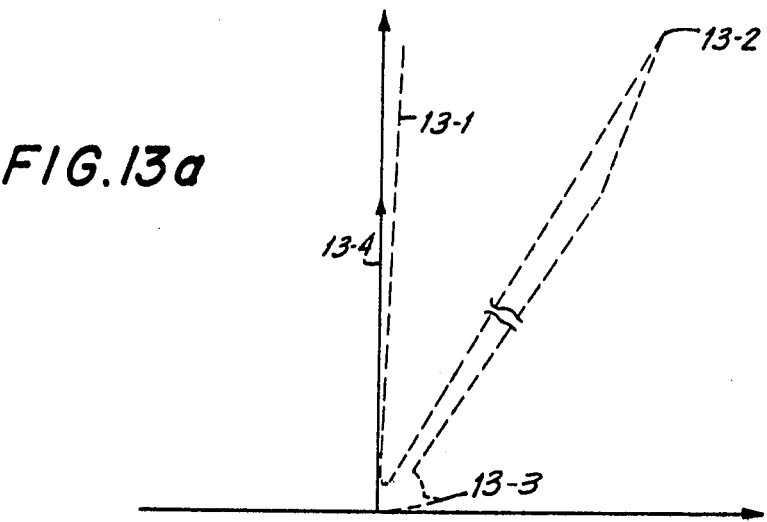
FIGS. 13(a) and (b) graphically illustrate the reflection characteristic of the base plates having the surfaces illustrated in FIGS. 11(a) and (b), respectively.

FIGS. 13(a) and (b) illustrate the reflection characteristics of base plates having surface forms similar to that illustrated in FIGS. 11(a) and (b), respectively. In FIG. 13(a) for the triangular section of FIG. 11(a), reflection characteristic 13-1 along normal direction 13-4 represents the intensity of incident light to be reflected in normal direction 13-4 from a horizontal inclined plane which corresponds to peak 12-1. Characteristic 13-2 corresponds to the intensity of incident light to be reflected in normal direction 13-4 from an inclined plane having an angle $\phi=15°$ corresponding to peak 12-2. Characteristic 13-3 corresponds to the intensity of incident light to be reflected in normal direction 13-4 from an inclined plane having an angle $\phi=45°$ corresponding to peak 12-3 in FIG. 12(a).

Figure 13B:
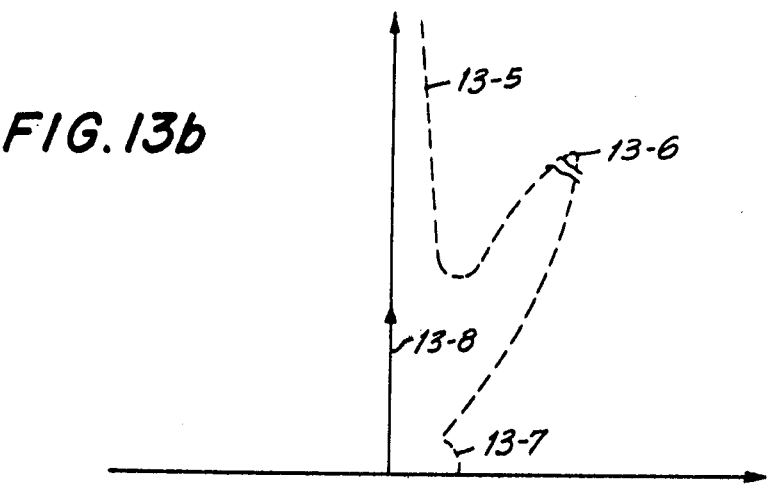

Similarly, in FIG. 13(b) characteristic 13-5 corresponds to the intensity of incident light to be reflected in normal direction 13-8 when reflected on a horizontal plane which corresponds to peak 12-4. Characteristic 13-6 corresponds to the intensity of incident light to be reflected in normal direction 13-8 when reflected from an inclined plane having angle $\phi=15°$ corresponding to peak 12-5. Characteristic 13-7 corresponds to the intensity of incident light to be reflected in normal direction 13-8 when reflected from an inclined plane having an angle $\phi=45°$ corresponding to peak 12-6 in FIG. 12(b).

The reflection characteristics illustrated in FIGS. 13(a) and (b) indicate that for the base plates illustrated in FIGS. 11(a) and (b) peaks occur when the angle of incident light is between about $\theta_1=60°$ and $\theta_2=90°$. When shifting from angles $\theta_1$ and $\theta_2$, the reflection characteristics decrease rapidly. Specifically, when a user views a base plate from a normal direction 13-4 or 13-8, the panel appears bright if the illumination is from a direction of angle $\theta=60°$. But the same panel will not appear bright if the incident light enters from other directions.

Figure 14:
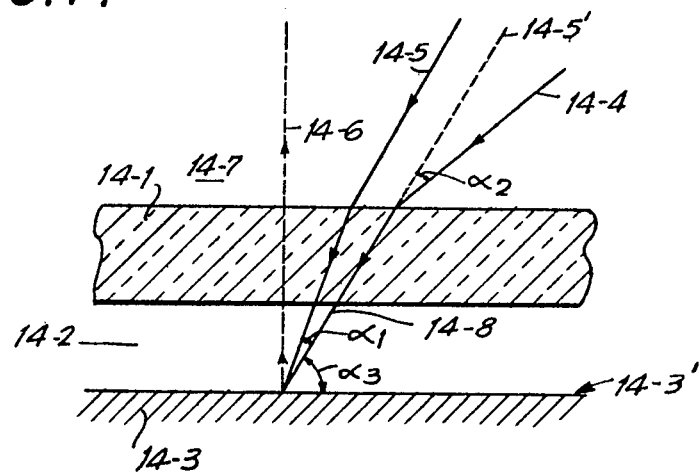
FIG. 14 illustrates the relationship between the reflection characteristics of the lower base plate and that of the liquid crystal display device.

The relationship between the reflection characteristics of the lower base plate and that of the liquid crystal panel is shown in FIG. 14. Incident light 14-4 and 14-5 approaches the liquid crystal panel from air 14-7 and enters upper glass plate 14-1 and travels into a liquid crystal layer 14-2. The refractive index (n) of liquid crystal 14-2 is greater than 1. The case where upper glass plate 14-1 and liquid crystal layer 14-2 have substantially equal refractive indexes will now be described.

Incident light entering liquid crystal material 14-2 between incident light 14-8 and 14-9 represented by an angle $\alpha_1$ correspond to incident light entering the display panel at an angle between incident light rays 14-4 and 14-5'. When a user views a base plate 14-3 from a normal direction 14-6, base plate 14-3 appears bright when the illuminating light approaches within the angle $\alpha_1$ between incident light rays 14-8 and 14-9 in the display panel. If base plate 14-3 is included in a liquid crystal display panel, the panel appears bright when the illuminating light approaches between the position indicated by incident light 14-4 and 14-5'. An angle $\alpha_2$ between incident light 14-4 and 14-5' is always greater than angle $\alpha_1$. Accordingly, the reflection characteristic of such a liquid crystal display panel has its peak intensity in a wider range than that illustrated in FIG. 13(a). For example, when the refractive index of upper glass plate 14-1 and liquid crystal material 14-2 is about 1.5, the critical angle of incident light with respect to the display panel and air 14-7 is about 40°. Thus, only incident light having an angle of incidence illustrated by $\alpha_3$ greater than 50° enters the liquid crystal layer. Accordingly, the base plate must have a characteristic wherein the intensity of light reflected in the direction normal to the base plate is very high when incident light enters at an angle $\alpha_3$ greater than 50° with respect to a horizontal base plate.

FIG. 13(b) illustrates the reflection characteristic for the base plate having a rugged surface similar to that illustrated in FIG. 11(b) wherein the section approaches a sine curve. Incident light entering from directions over a wider range is reflected in the normal direction compared with FIG. 13(a). Thus, in accordance with this embodiment of the invention, the intensity of reflected light in the normal direction 13-8 is very large. If a base plate of the type illustrated in FIG. 11(b) is used in a liquid crystal display panel, the ratio of light reflected in the normal direction of the incident light entering from a wider range of direction is increased because the difference of the refractive indexes between the liquid crystal layer and the air. Accordingly, a desirably broader viewing angle or such a liquid crystal panel may be obtained.

Based on these experimental results and computer simulations, it has been found that the distribution of the angle of inclination of the inclined plane on the surface is concentrated within the range between 0° and 30° with respect to the horizontal. Although a portion of the surface may have a greater angle of inclination, the extent of planes greater than 30° does not exceed 30% of the surface area of the electrode. Preferably, it is desirable that the angle of inclination of the electrode surface be uniformly distributed between about 0 degrees and 30 degrees. In this case, the half-width of the peaked distributions other than that located near 0° must be 0.1° or more. If there are many peaked distributions at angles other then 0°, the subtotal of the half-width of the peaked distributions must be 0.1° or more. The precentage of the surface area occupied by rugged surface regions with an angle of inclination between about 2° to 30° preferably is 20% or more of the area occupied by rugged surface regions. Further, the standard deviation of the distribution of the regions corresponding to each angle between 5° and 25° must be 2° or more. Additionally, the average inclination angle of the surface area should lie between 1° and 25°. If the above noted conditions are satisfied, a liquid crystal display panel appears bright over a broad viewing angle may be readily provided.

The above-noted conditions may be represented by a general formula which takes into consideration the relationship of the refractive indexes of the liquid crystal material. More than 70% of the surface area of the electrode surface be occupied by inclined planes having an inclination angle less than $\frac{1}{2} \sin^{-1} [1/(n_\perp + n_\parallel)]$ degrees. Additionally, the standard deviation of the distribution of the surface area corresponding to each angle between $\frac{1}{2} \sin^{-1} [1/(n_\perp + n_\parallel)]$ degrees and $1/10 \sin^{-1} [1/(n_\perp + n_\parallel)]$ degrees must be greater than $1/15 \sin^{-1} [1/(n_\perp + n_\parallel)]$ degrees. In the formulas, $n_\perp$ represents the refractive index in the direction vertical to the long molecular axis of the liquid crystal molecule and $n_\parallel$ represents refractive index in the direction parallel to the long molecular axis of the liquid crystal molecule.

As noted above, providing a bright base plate depends on the inclination angle of the rugged regions of the surface. Additionally, if a polarizer is utilized in a liquid crystal display device with the base plate adjacent to the liquid crystal layer, brightness is heavily dependent on whether the polarization characteristic of the light is destroyed. If so, a darkening occurs as described in connection with FIG. 3. Generally, in an effort to avoid darkening of a polarized panel, it is necessary that the inclination angle of the rugged regions of the surface be reduced. This prevents incident light from being reflected from more than one surface on the base plate. To do so a pitch of the rugged surface should be several times or more as great as the wavelength of the light.

In other words, in order to provide a base plate with acceptable reflection characteristics, preferably that the depth of the rugged surface is greater than 0.3 μm and the average pitch is greater than 1 μm. It is also preferred that the portion of the surface with a pitch less than 0.7 μm represents 30% of the entire surface area.

Figure 15:
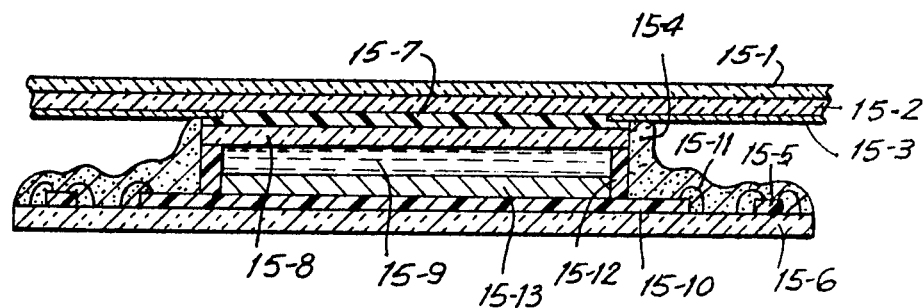
FIG. 15 is a cross-sectional view illustrating a liquid crystal display device constructed and arranged in accordance with the invention.

FIG. 15 is a sectional view illustrating a liquid crystal display device including a base plate constructed and arranged in accordance with the invention and including an anti-reflection coating on the upper parting glass plate for providing a bright display panel. The display device includes a ceramic substrate 15-6 having a lower plate 15-10 of silicon disposed thereon. Lower plate 15-10 is formed with an aluminum electrode 15-13 having a rugged surface in accordance with the invention. An upper transparent plate 15-8 is positioned opposite and parallel to lower plate 15-10 with a space provided therebetween by a spacer 15-12. A liquid crystal material 15-9 is disposed within the space between upper plate 15-10 lower plate 15-10 and a transparent resin 15-4 seals the display portion of the device. A polarizer 15-7 is disposed over upper plate 15-8 and a parting glass plate 15-2 is positioned over the display portion of the panel. Parting plate 15-2 includes a painted masking region 15-3 for keeping from view the non-display portions of the device, such as IC 15-5 and connecting wires 15-11 for controlling operation of the display device.

A thin anti-reflection coating 15-1 is disposed on the upper surface of parting glass plate 15-2 for preventing incident light from the air from being reflected at the surface of plate 15-2. In this manner, a liquid crystal display panel which is easy to view can be provided by including base plate 15-10 constructed and arranged in accordance with the invention. The intensity of reflected light in the direction normal to the base plate is large while maintaining the polarized direction of the incident light reaching the liquid crystal material and prevent reflection occuring on each boundry plane between each layer of the device.

The invention has been described with respect to a display panel including a semiconductor substrate and a guest-host liquid crystal material. It is to be understood that the invention encompasses a display panel which performs in a reflection-type display mode and wherein an opaque base plate is used and the electrode functions as a refelector. The invention is applicable, not only to the guest-host liquid crystal material, but also to a colored liquid crystal material. Additionally, an opaque base plate constructed and arranged in accordance with the invention is suitable for use in a display panel wherein the base plate is utilized for providing a bright portion of the display.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device comprising an upper transparent plate and an opposed lower plate, both plates having electrodes disposed thereon and a liquid crystal material in the space between the plates, the electrode provided on the lower plate being an opaque material having a rugged surface wherein the average angle of inclination ($\phi$) of an inclined plane tangent to the rugged regions of the surface is about $\frac{1}{2} \sin^{-1} [1/(n_\perp + n_\parallel)]$ degrees or less with respect to the lower plate, wherein $n_\perp$ is the refractive index in the direction perpendicular to the long molecular axis of the liquid crystal molecule and $n_\parallel$ is the refractive index in the direction parallel to the long molecular axis of the liquid crystal molecule.

2. The liquid crystal display device of claim 1, wherein the rugged region of the opaque electrode having an angle of inclination $\phi$ occupies about 60% or more of the surface area of the opaque electrode.

3. The liquid crystal display device of claim 2, wherein said regions occupy about 70% or more of the surface area.

4. The liquid crystal display device of claim 3, wherein about 15% or more of the area of said opaque electrode is occupied by inclined planes having an angle of inclination between about $1/15 \sin^{-1} [1/(n_\perp + n_\parallel)]$ and $\frac{1}{2} \sin^{-1} [1/(n_\perp + n_\parallel)]$ with respect to the lower plate.

5. The liquid crystal display device of claim 4, wherein the rugged regions of the surface are characterized by a distribution curve of area versus inclination angles having a point where the first differential coefficient $= 0$ and the second differential coefficient $\leq 0$ for an angle of inclination lying between about $1/12 \sin^{-1} [1/(n_\perp + n_\parallel)]$ and $10/12 \sin^{-1} [1/(n_\perp + n_\parallel)]$ degrees.

6. The liquid crystal display device of claim 5, wherein the rugged regions of the surface are characterized by a standard deviation of the inclination angles in said distribution curve of 2° or more.

7. The liquid crystal display device of claim 4, wherein the average pitch of the rugged regions of the surface of the opaque electrode is greater than 1 µm.

8. The liquid crystal display device of claim 4, wherein the portion of the rugged regions of the surface of the opaque electrode having a pitch less than 0.7 µm is about 30% or less of the surface area of the electrode.

9. The liquid crystal display device of claim 4, wherein the opaque electrode is a metal characterized by a surface having a reflectance of about 80% or more across the entire visible light range of wavelengths between about 400 µm to 800 µm when incident light enters the device from a direction substantially perpendicular to the plates.

10. The liquid crystal display device of claim 4, further including a polarizer disposed parallel to the upper plate.

11. The liquid crystal display device of 10, wherein the liquid crystal material is one of a guest-host liquid crystal material and a colored liquid crystal material.

12. The liquid crystal display device of claim 11, wherein the guest-host liquid crystal material includes a numetic liquid crystal material as a host.

13. The liquid crystal display device of claim 4, wherein about 20% or less of the surface area of the rugged surface has an angle of inclination $\phi$ lying between about $1/12 \sin^{-1} [1/(n_\perp + n_\parallel)]$ and $10/12 \sin^{-1} [1/(n_\perp + n_\parallel)]$ degrees and the depth of the rugged regions being more than 'µm.

14. The liquid crystal display device of claim 4, wherein the opaque electrode is an aluminum material.

15. A liquid crystal display device comprising an upper transparent plate and an opposed lower plate, both plates having electrodes disposed thereon and a liquid crystal material in the space between the plates, the electrode provided on the lower plate being an opaque material having a rugged surface wherein the average angle of inclination ($\phi$) of an inclined plane tangent to the rugged regions of the surface is about 30° or less with respect to the lower plate and the area of the surface wherein $\phi$ is over 40° occupies 30% or less of the whole area of the electrode surface.

16. The liquid crystal display device of claim 15, wherein the rugged regions of the opaque electrode have an average angle of inclination $\phi$ between about 10° and 15°.

17. The liquid crystal display device of claim 16, wherein the rugged regions of the surface are characterized by a standard deviation of the distribution curve of area versus inclination angle of 2° or more, said distribution curve located between about 5° and 25°.

18. The liquid crystal display device of claim 16, wherein the average pitch of the rugged regions of the surface of the opaque electrode is greater than 1 'µm.

19. The liquid crystal display device of claim 16, wherein the portion of the rugged regions of the surface of the opaque electrode having a pitch less than 0.7 µm is about 30% or less of the surface area of the electrode.

20. The liquid crystal display device of claim 16, wherein the opaque electrode is a metal characterized by a surface having a reflectance of about 80% or more when incident light enters the device from a direction substantially perpendicular to the lower plate.

21. The liquid crystal display device of claim 16, wherein the opaque electrode is an aluminum material.

22. An opaque electrode for a lower base plate of a lquid crystal display device comprising a metal film having a rugged surface wherein the average angle of inclination of an inclined plane passing through the rugged regions of the electrode surface is about $\frac{1}{2} \sin^{-1} [1/(n_\perp + n_\parallel)]$ degrees or less with respect to the lower plate.

23. The opaque electrode of claim 22, wherein the regions having an angle of inclination about $\frac{1}{2} \sin^{-1} [1/(n_\perp + n_\parallel)]$ or less comprises 70% or more of the surface area of the electrode.

24. The opaque electrodes of claim 23, wherein the average pitch of the rugged regions is more than 'µm and the depth thereof is less than 5 µm.

25. The opaque electrode of claim 22, wherein the electrode is a metal having a reflectance of 80% or more with respect to incident light entering from a direction substantially perpendicular to the electrode surface.

26. The opaque electrode of claim 25, wherein the electrode is an aluminum material.

* * * * *